March 9, 1937.  P. J. DARLINGTON  2,073,365
GAUGE
Filed Feb. 5, 1931  2 Sheets-Sheet 1

Inventor:
Philip J. Darlington
by Jesse G. Holton
Atty

March 9, 1937. P. J. DARLINGTON 2,073,365
GAUGE
Filed Feb. 5, 1931  2 Sheets-Sheet 2

Inventor:
Philip J. Darlington
by Jesse A. Holton
Atty.

Patented Mar. 9, 1937

2,073,365

UNITED STATES PATENT OFFICE 2,073,365

GAUGE

Philip J. Darlington, Cambridge, Mass.; Rebecca T. M. Darlington, executrix of said Philip J. Darlington, deceased, assignor to Robert G. Morse, Marblehead, Mass.

Application February 5, 1931, Serial No. 513,644

26 Claims. (Cl. 33—148)

This invention relates to micrometer indicator gauges and, with regard to more specific features thereof, to those of the automatic continuous indicator type such as may be used in connection with a wire or cable insulating machine adapted to indicate any variations in the material, either above or below a given standard diameter or thickness.

One of the objects of my invention is to provide a gauge of this character which may be readily applied to a tubing machine at small expense and requires no changes of design therein. Another object is to provide a pair of anvils adapted to present a four point contact to circular material thereby offering maximum resistance to pressure between the anvils and indicating an accurate mean diameter in the event that said material should be slightly oval. Another object is to provide friction means to guard against "clashing" of the anvils by the operator, thereby eliminating possibility of mutilation and subsequent inaccurate indication. A further object is to provide manual adjustment of the movable anvil support to obtain a desired amount of pressure on the material to be acted upon. Other objects will be apparent from the following description and claims.

A preferred embodiment of my invention is illustrated in the accompanying drawings, in which:—

In the production of insulated wire and cable, accurate control of diameter permits meeting the specifications of wall thickness with the minimum amount of insulating compound and the maximum of production economy. It improves the quality of the product and reduces its cost. Uniform and correct diameter also eliminates failures in electrical tests and rejections from either undersize or oversize. To meet the above requirements, it will be clear that an indicator of this character must be continous and accurate at all times, yet simple and easily readable.

Figure 4:
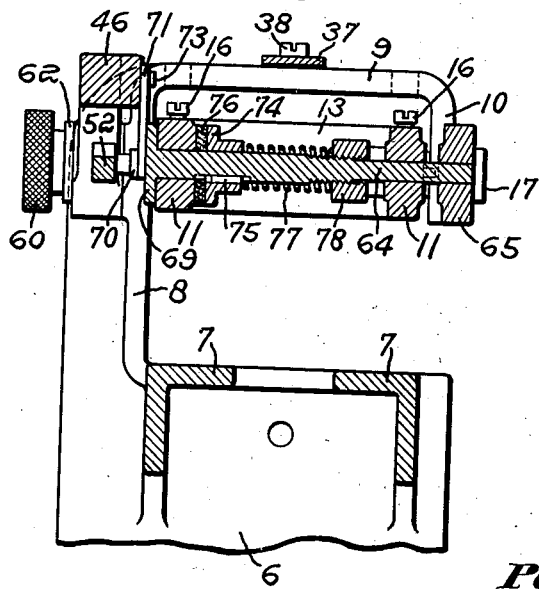
Figure 4 is a transverse section on line 4—4 of Figure 1.

The frame of the device illustrated comprises a plate portion 6 adapted to be attached to a machine, the product of which is to be gauged. A pair of integral arms 7 extend therefrom to provide a support for one of the anvils or rolls. An upstanding side portion 8 of the frame extends across the top of the device at 9 and presents a depending ear 10 opposite the side 8. This construction provides a frame (see Fig. 4) which is open at one side and at both ends permitting easy introduction and removal of material to be gauged.

Pivotally mounted in the upper part of the frame is a rectangular anvil supporting member comprising a pair of horizontally extending arms 11 connected by transverse portions 12 and 13. The ends 14 of the arms 11 are drilled to receive a shaft 15 and are made fast thereto by set screws 16. The outer ends of the shaft 15 may be reduced in size and mounted in suitable bearings 17 and 18 supported by the depending ear 10 and the upstanding portion 8 of the frame structure, the shaft 15 being free to rock within said bearings. The bearing 17 may be of a quick detachable type to be presently described in connection with the anvil shafts. The bearing 18 extends beyond the frame portion 8 and is utilized to provide a pivotal support for a gauge supporting bracket to be described later.

The outer ends of the arms 11 are adapted to receive specially designed bearings 19 which may be of bronze or other wear-resisting material. These bearings 19 are drilled to receive the reduced ends 20 of an anvil supporting shaft 21 upon which is fixedly mounted an anvil 22, it being understood that the reduced portions 20 of said shaft are free to rotate within the bearings 19. It should be noted that clearance is provided at 23 between the shaft 21 and the inner ends of the bushings 19. This permits a limited amount of lateral self adjustment for the anvil 22 and will allow said anvil to centralize itself with respect to the material to be gauged.

The bearings 19 are preferably threaded at their outer ends, indicated at 24, to receive suitable lubricating means such as oil cups.

It is necessary to remove the anvil 22, with its shaft 21 frequently to replace it with one of a different size to meet requirements of production. For example, the anvil 22 may be designed to operate on material up to a given diameter and it would be necessary to change anvils for material of a greater diameter.

Figure 1:
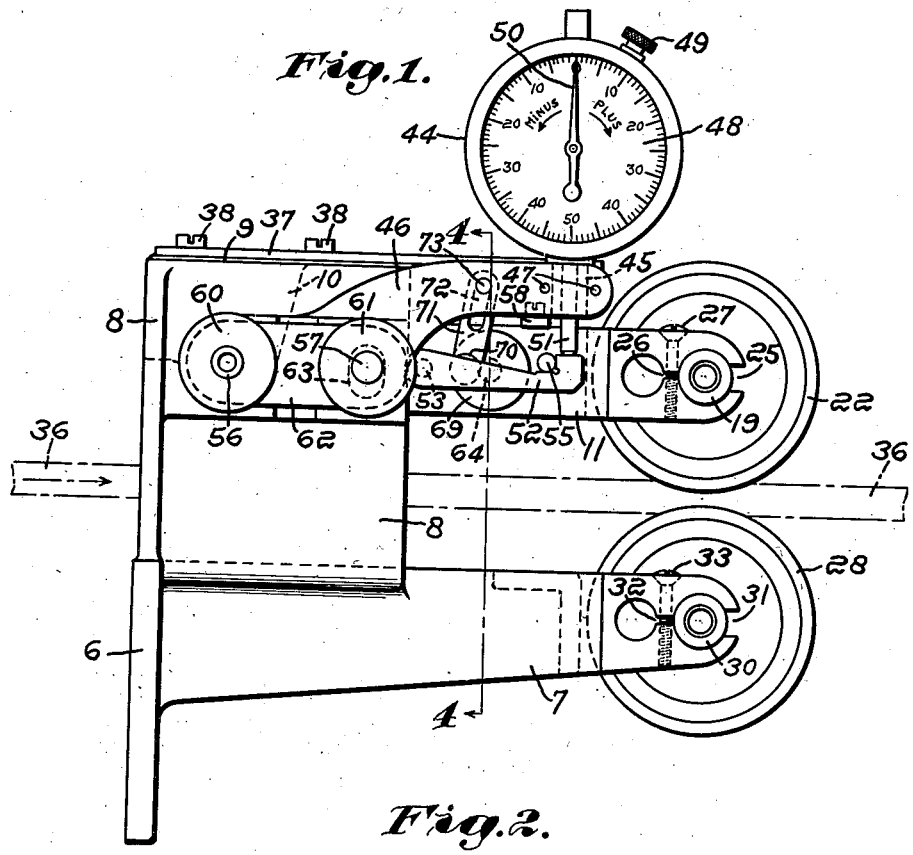
Figure 1 is a side elevation of a device embodying my invention.
Figure 2:
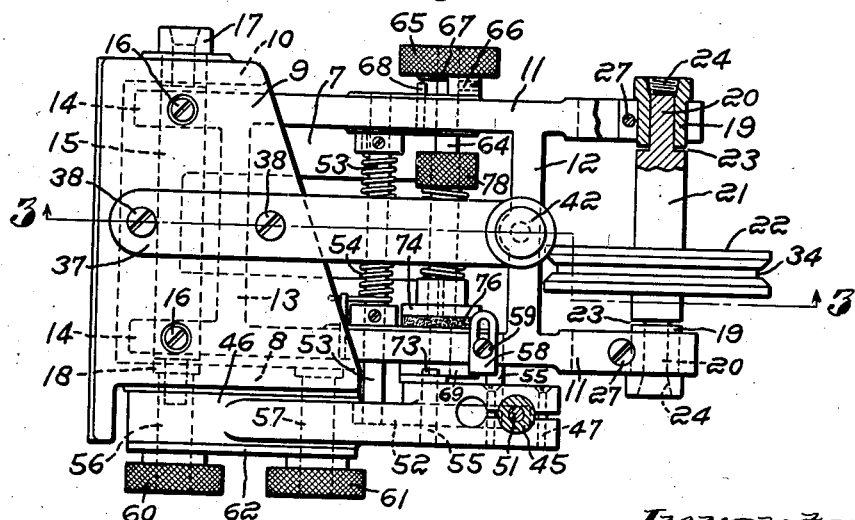
Figure 2 is a plan view thereof.

Referring to Figures 1 and 2, the outer ends of the arms 11 may be forked as indicated at 25 and transversely drilled to receive the bearings 19. The arms may be slotted as at 26 and provided with clamping screws 27 adapted to normally retain the bearings 19 therein. Releasing this clamping action by backing off the screws 27 will permit withdrawal of the bushings 19 outwardly and clear of the portions 20 of the anvil shaft 21. The anvil with its shaft may then be withdrawn outwardly from the arms 11, the reduced portions 20 passing through the openings 25. Another anvil and shaft may be easily installed by reversing the operation.

Directly beneath the anvil 22 and cooperating therewith to constitute initial gauging means, I provide a similar anvil 28 mounted in the outer ends of the fixed arms 7 above referred to and in vertical alinement with the anvil 22. The anvil 28 may be fixedly mounted on a shaft 29 similar to shaft 21. In fact, the construction and method of mounting the shaft 29 is identical with that of shaft 21, it being provided with bearings 30 similar to bearings 19. The outer ends of arms 7 are forked at 31, slotted at 32, and provided with clamping screws 33. It will be clear, therefore, that the anvils and their shafts are interchangeable which is an advantage with regard to the manufacture thereof.

The anvils or rolls 22 and 28 are provided with annular grooves 34 (see Fig. 5) forming oppositely disposed flanges 35 adapted to engage the outer surface of material to be gauged. This construction affords a four point contact with the material and will average the diameter of slightly oval sections. Furthermore, it lessens the tendency to flatten soft material which might be due to the weight of an upper anvil and its support.

A section of material, such as insulated wire, is represented at 36 to illustrate the relation thereof with regard to the anvils 22 and 28 when in operative position.

It will be apparent from the foregoing that one pair of gauging rolls may be removed and another suitably sized pair substituted when it is desired to accommodate stock which is considerably larger or smaller in diameter.

Figure 3:
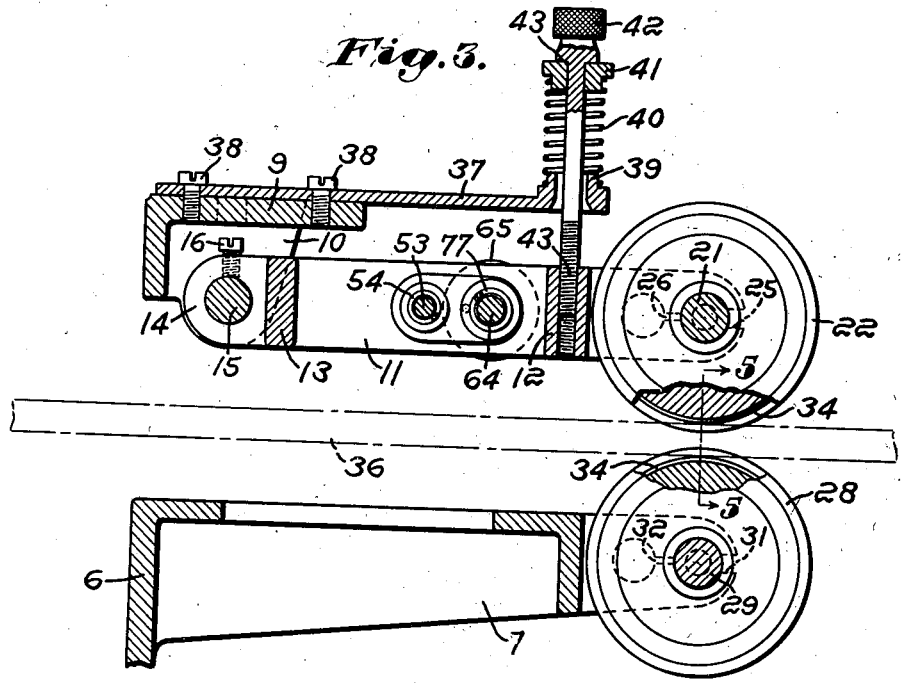
Figure 3 is a section on the line 3—3 of Figure 2.

Referring to Figure 3, it will be clear that the anvil 28 is not yieldable and that the anvil 22 is yieldable because mounted on a frame comprising the arms 11 which are pivoted at the points 17 and 18. It is desirable to provide means for varying the amount of pressure which the anvil 22 may exert upon the material 36 to obtain best results. For example, if the nature of the insulating material is soft, then less pressure thereon is desirable. I obtain this result by the use of an adjustable counter-balance comprising an extension arm 37 attached to the top portion 9 of the frame as by screws 38. The outer end of this arm is provided with a boss 39 adapted to form a seat for a compressible spring 40, the opposite end of the latter being in engagement with a spring retaining collar 41. An adjusting thumb screw 42 is shouldered at 43 to limit outward movement of the collar 41. The lower end of screw 42 is threaded into the transverse member 12 of the arms 11, as indicated at 43. Rotation of the screw 42 in a clockwise direction will shorten the distance between the member 12 and the collar 41, thereby compressing the spring 40 to a point where it will overcome the weight of arms 11 and their associated parts. Any further rotation of screw 42 will raise the anvil 22 away from the material 36. It will be clear that by reversing rotation of the screw 42, the anvil 22 may be brought into contact with the material at any desired amount of pressure less than the weight of said anvil and its associated parts. Another advantage of this construction is that it lessens the load to be carried by the anvil 28 and the bearings 30.

It is obvious that any variations in the mean diameter of material which is continuously passing between the anvils will transmit vertical movement to the arms 11 through the anvil 22. These variations are transmitted from the arms 11 to an indicator 44 and are greatly multiplied therein, said indicator comprising the well known micrometer construction.

The indicator 44 is provided with a depending stud portion 45 (Fig. 1) adapted to be received by an adustable supporting bracket 46 and attached thereto by clamping screws 47. Said indicator 44 is provided with an adjustable dial 48 and clamping means 49 therefor of well known construction. This permits fine adjustment of the dial 48 independent of an indicating finger 50. Said finger 50 is connected through suitable gearing to an indicator operating element or plunger 51 which is normally pressed in contact with an arm 52 mounted on the end of a shaft 53, the latter being supported by the arms 11. The lever 52 is pressed by a torsion spring 54 against a stud 55 projecting from one of the arms 11. The pressure of this spring 54 is sufficient to overcome maximum pressures which may be developed within the indicator 44 acting on the plunger 51. Said lever 52 is disengaged from the stud 55 only in the event that the arms 11 are raised beyond the operating range of the indicator plunger 51.

It should be understood that the indicator plunger 51 is normally seated against the lever 52 by spring pressure contained within the instrument, therefore any rotary movement of the arms 11 will be transmitted to the plunger 51 and be indicated by the finger 50. After proper setting of the finger to register zero for a standard diameter between the anvils any variation to less than the standard diameter of the material 36 will cause the finger 50 to move to the minus side of 0 and likewise, any increase of diameter will register on the plus side of 0.

The indicator bracket 46 is pivotally mounted on a stud shaft 56 which may be an extension of the bearing 18. A stud shaft 57, fixedly mounted in the frame portion 8, is utilized to provide clamping means after adjustment for the bracket 46. This adjustment is made necessary when changing the device to operate on material of a different standard diameter. The relative position of the bracket 46 and the arms 11 should remain the same during such adjustment so that the indicator finger 50 will remain at 0. For example, if material of substantially larger diameter than that represented at 36 is to be operated upon, the anvil 22 must be raised, therefore, the bracket 46 must be raised a corresponding amount to allow the finger 50 to remain at 0.

To accomplish this result, I provide a slidable finger 58 (Fig. 2) attached to the arm 11 by a clamping screw 59. During normal operation, this finger 58 does not function. In making a change of adjustment, as described above, the screw 59 may be released to allow the finger 58 to be moved outwardly beneath the bracket 46. The screw 59 may then be tightened and the bracket 46 adjusted to engage the upper face of the finger 58. This provides a fixed relation between the arms 11 and the bracket 46. Clamping nuts 60 and 61 on the studs 56 and 57 respectively, cooperating with a clamping plate 62, may be tightened to maintain the position of bracket 46. The finger 58 must then be returned to its normal position as shown in Figure 2. It should be noted that the bracket 46 is provided with an elongated slot 63 at its point of engagement with the clamping stud 57 to permit adjustment thereof as above described.

It is necessary at times to raise the anvil 22 from the normal operating position to facilitate the introduction of new material, or to change the anvils as previously described. I prefer to employ a friction device for this purpose, the details of which are clearly shown in Figure 4.

A manually operable rock shaft 64 is mounted in suitable bearings provided by the arms 11, said shaft being provided at one end thereof with a small hand wheel 65 made fast to said shaft. The hub 66 of the hand wheel is cut away at 67 (Fig. 2) to points diametrically opposite each other forming shoulders at said points which cooperate with a fixed pin 68, mounted in the arm 11, to limit rotation of the shaft 64 to substantially 180°. The opposite end of the shaft 64 is provided with an integral disc or crank member 69 and a crank pin 70. A link 71 provided with an elongated slot 72 cooperating with a fixed pin 73 (Fig. 1) mounted in the bracket 46, provides a temporary raising device for the arms 11 and associated parts.

When the anvil 22 is to be raised for "threading", the hand wheel 65 may be turned to rotate the shaft 64 counter-clockwise, as viewed in Figure 1, which would place the crank pin 70 in its lowest position and on dead center with respect to shaft 64 and pin 73. Reversing the above operation would gradually lower the anvil 22 until it came in contact with the material 36 as shown in Figure 1. Obviously, the anvil could not descend further because the pin 73 is at the end of slot 72. However, when the shaft 64 has been turned the full 180°, as above described, crank pin 70 will be on top center and the outer end of slot 72 will have moved away from pin 73 and the arms 11 will be free to rise and fall with any variations of the material 36.

When the arms 11 have been raised, as described, and crank pin 70 is on lower dead center, it will be supporting the weight of arms 11 and associated parts. If moved from dead center, the weight of the parts would naturally cause the load to fall which would result in mutilation of the anvils. To prevent such action taking place, I provide variable friction means cooperating with the shaft 64. A disc 74 is feather-keyed to shaft 64 as indicated at 75. Interposed between said disc and the inner face of the arm 11 is a friction washer 76 which may be of leather or any suitable material. A compression spring 77 is interposed between the hub of disc 74 and an adjustable collar 78 threaded on the shaft 64. Rotation of the collar 78 in one direction will compress the spring 77 and force the disc 74 into frictional engagement with the washer 76 and thereby retard rotating action of the shaft 64. The collar 78 may be easily adjusted by hand to obtain the proper amount of friction necessary to offset the weight of arms 11 and associated parts, minus what assistance has been obtained from the spring 40 described above.

The action of this friction device on shaft 64 should not be confused with the counterbalance construction described earlier in the specification because they have no common connection. The former is not in use and performs no function whatever during operation of the device as an indicator. The latter functions at all times as a counter-balance for the arms 11 and all parts mounted thereon.

It should be noted that the shape of the circumferential grooves of rolls 22 and 28 is such that a gate for the fed stock is provided in which the engaging faces are all tangential to the stock and four spaced lines of contact are provided, two above and two below. By reason of this construction, soft coated stock may be continuously gauged with accuracy and without danger of scoring, flattening or otherwise deforming the coating. This advantage is further obtained by the adjustable spring counterbalance by which the weight of arm 11 and all parts thereon including the roll 22 may be controlled to apply the roll lightly on the stock. In addition to this, the permitted range of axial play of the anvils or rolls prevents scoring by the edges of the rolls and if the stock assumes a temporary ovality without changing its circumferential dimension the rolls may shift laterally in relation to each other under control of the stock acting upon the roll flanges, and in the average instance such change in shape will not be seriously reflected in the indicator, whereas without this capability of axial play there possibly would be unintended and misleading indicator readings.

Figure 5:
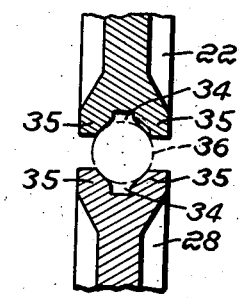
Figure 5 is a detail section on line 5—5 of Figure 3 showing on an enlarged scale the four point contact feature of the anvils.

Obviously the relative lateral shift may be obtained in various ways, as by mounting both rollers with axial play or mounting one roller with axial play and holding the other against substantial transverse movement although leaving it free to rotate in its journals. Fig. 5 of the drawings shows a preferred form of roller in which the material engaging faces of each roller are at a 90 degree angle. This makes it possible to work out a leverage ratio in the transmission to the indicator which remains constantly accurate for material of different sizes gauged by the same rollers, yet owing to rolling contact of the rollers on the material at spaced lines only and owing also to the adjustable counterbalance the friction and weight are reduced to a minimum. The 90 degree faces of the rollers also distribute the pressure of the rollers in such manner that flattening of the soft coated material is substantially avoided.

While the above described gauge has particular application to the gauging of soft coated materials, its use is not limited to these, and many of the features of invention herein described and claimed may be incorporated in the same or different specific form in gauges for other materials.

What I claim is:—

1. In a gauge, the combination of a frame, a fixed gauging roll supported by said frame, a movable gauging roll mounted in said frame directly above said fixed roll, each of said rolls having an annular groove with opposing angular faces adapted to provide contact along four spaced lines with substantially cylindrical material being fed to be gauged.

2. A gauge comprising a frame having an open side and a closed side, an adjustable indicator bracket supported by the closed side of said frame, an indicator mounted upon said bracket, a movable arm pivoted in said frame, a gauging roll supported by said arm, another gauging roll fixedly supported by said frame for cooperation with the first said roll, and means adapted to be interposed between said movable arm and said bracket to determine a fixed relation therebetween.

3. A gauge comprising a frame having an open side and a closed side, an adjustable indicator bracket supported by the closed side of said frame, movable anvil supporting arms pivoted in said frame, a manually operable shaft mounted in said arms, friction means to control the rotation of said shaft, a crank and crank pin fast to one end of said shaft, a lost motion link connection between said crank pin and said adjustable bracket whereby said anvil supporting arms may be raised and lowered by rotation of said shaft.

4. A gauge, comprising a frame having journal means for a lower gauging roller, a bracket adjustable on said frame and means for fixing the bracket in adjusted position, an indicator supported by said bracket having an operating plunger, a member pivoted in said frame carrying an upper gauging roller, a lower gauging roller in the said journal means, and a member yieldingly held on said pivoted member adapted to govern the operating plunger of the indicator.

5. A gauge, comprising a frame having journal means for a lower gauging roller, a bracket adjustably mounted on said frame, an indicator supported by said bracket having an operating plunger, a member pivoted in said frame carrying an upper gauging roller, a lower gauging roller in the said journal means, a member yieldingly held on said pivoted member adapted to govern the operating plunger of the indicator, and means for manually moving said pivoted member to spread and reset the rollers comprising a shaft in the pivoted member, means imposing a drag on rotative movement of said shaft, a crank on said shaft and a lost motion connection between the crank and said bracket.

6. A gauge, comprising a frame having spaced arms adapted to journal a lower gauging roller, an upstanding side portion, a top and a depending ear on the opposite side, a bracket pivotally adjustable on said upstanding side portion, means for securing said bracket in adjusted position, an indicator supported by said bracket having an operating plunger, a member pivoted in said frame carrying an upper gauging roller, a lower gauging roller in the journal means of said spaced arms, a stop on said pivoted member, a spring pressed member on said pivoted member bearing against said stop and co-acting with the indicator plunger.

7. A gauge, comprising a frame having journal means for a lower gauging roller, a bracket on said frame, an indicator supported by said bracket having an operating element, a member pivoted in said frame carrying an upper gauging roller, a lower gauging roller in the said journal means, a member on said pivoted member adapted to govern movement of the indicator operating element, lost motion means connecting the pivoted member and the bracket, and means for operating said connecting means comprising a friction device for imposing a drag on the operation.

8. In a device for continuously gauging fed stock, a frame, a pair of cooperatively associated rollers mounted in said frame for relative bodily movement to increase and decrease the distance between them and free to rotate under frictional contact with the fed stock and also free to move relatively axially to a limited extent to adjust themselves to the stock, an indicator having an operating element, and means governing movement of the indicator operating element in accordance with relative bodily movement of said rollers, at least one of said rollers having opposite side flanges defining a deep annular groove with faces converging inwardly to afford line contact with the fed stock at spaced regions.

9. In a device for continuously gauging fed stock, a frame, a pair of cooperatively associated rollers mounted in said frame for relative bodily movement to increase and decrease the distance between them and free to rotate under frictional contact with the fed stock and also free to move relatively axially to a limited extent to adjust themselves to the stock, an indicator having an operating element, means governing movement of the indicator operating element in accordance with relative bodily movement of said rollers, at least one of said rollers having opposite side flanges defining a deep annular groove with faces converging inwardly to afford line contact with the fed stock at spaced regions, and an adjustable counterbalance device for the said flanged roller whereby its pressure contact with the stock may be regulated.

10. In a device for continuously gauging fed stock, a frame gauging roller supporting means thereon, a member pivoted on said frame having gauging roller journal means, a bracket pivotally mounted on said frame, means for securing said bracket in different pivotal positions thereon, an indicator having a spring plunger, said indicator being mounted in said bracket, a stop and a spring pressed arm on said pivoted member, the spring urging the arm against the stop and holding it in engagement with said plunger, a gauging roller on said supporting means, an opposed gauging roller in the journal means of said pivoted member, a shaft rotatable in said pivoted member having a crank, a link connection between the crank and said bracket including a lost motion device, friction means for imposing a drag on the shaft in its rotation, and a handle on said shaft for rotating same whereby the lost motion may be taken up, the pivoted member moved relatively to the bracket to separate said rollers, and the rollers again closed on stock, all under the influence of the drag, and further movement of the handle will reeffect the lost motion.

11. In a device for the continuous gauging of substantially cylindrical fed stock, a pair of gauging rollers, means for supporting said rollers to be freely rotatable, relatively movable axially to a limited extent and relatively bodily movable to increase and decrease the distance between them, an indicator, and means for transmitting relative bodily movements of said rollers proportionally to said indicator, at least one of said rollers having a substantially V-shaped circumferential groove whereby said roller embraces the stock and contacts therewith at spaced lines as the stock is fed and said roller is rotated.

12. In a device for the continuous gauging of substantially cylindrical fed stock, a frame, a lower gauging roller journaled therein, a member movably mounted on said frame, an upper gauging roller journaled in said member with provision for a restricted amount of axial play, both of said gauging rollers having substantially V-shaped circumferential grooves providing stock contacting surfaces at spaced lines along the upper and lower portions of the stock being fed, an indicator, and transmission devices thereto from said movably mounted member.

13. In a device for the continuous gauging of substantially cylindrical fed stock, means for receiving the fed stock comprising a pair of opposed gauging rollers one of which has a substantially V-shaped groove at its circumference, one of the rollers supporting the stock and the other roller resting upon the supported stock, an indicator, and means for transmitting to said indicator relative bodily movements of said rollers which increase or decrease the distance between them as said rollers rotate by contact with the fed stock, said rollers having provision for limited axial play relatively while transmitting said relative bodily movements to said indicator.

14. In a device for the continuous gauging of substantially cylindrical fed stock, a cooperative pair of gauging anvils, means mounting said anvils for relative bodily movement to increase and decrease the distance between them, and for relative bodily shift transversely of the stock, an indicator, means for transmitting said relative bodily movement proportionally to said indicator, at least one of said anvils having flanges adapted to contact the fed stock on opposite sides so as to fit the stock and at the same time be capable of control by the stock in respect to the relative bodily shift of the anvils.

15. In a device for the continuous gauging of fed stock, a pair of cooperative gauging rollers mounted for relative bodily movement to increase and decrease the distance between them, an indicator, and means for transmitting to said indicator relative bodily movement of said rollers in either direction, said rollers having circumferential grooves each with opposed engaging faces tangential to the stock to contact the fed stock only at spaced lines of contact.

16. In a device for the continuous gauging of fed stock, a pair of cooperative gauging rollers mounted for relative bodily movement to increase and decrease the distance between them, an indicator, means for transmitting to said indicator relative bodily movement of said rollers, said rollers having circumferential grooves each with opposed engaging faces tangential to the stock to contact the fed stock only at spaced lines of contact, one of said rollers being adapted to support the stock in its passage and the other roller bearing on the stock to be rolled by frictional engagement therewith, and means counterbalancing said other roller.

17. In a device for the continuous gauging of fed stock, a pair of cooperative gauging rollers mounted for relative bodily movement to increase and decrease the distance between them, an indicator, means for transmitting to said indicator relative bodily movement of said rollers, said rollers having circumferential grooves each with opposed engaging faces tangential to the stock to contact the fed stock only at spaced lines of contact, one of said rollers being adapted to support the stock in its passage and the other roller bearing on the stock to be rolled by frictional engagement therewith, and spring means counterbalancing said other roller whereby bearing pressure on the stock is reduced and impact of the roller on the stock is cushioned.

18. In a device for the continuous gauging of fed stock, a pair of cooperative gauging rollers mounted for relative bodily movement to increase and decrease the distance between them, an indicator, means for transmitting to said indicator relative bodily movement of said rollers, said rollers having circumferential grooves each with opposed engaging faces tangential to the stock to contact the fed stock only at spaced lines of contact, one of said rollers being adapted to support the stock in its passage and the other roller bearing on the stock to be rolled by frictional engagement therewith, and spring means counterbalancing said other roller, whereby bearing pressure on the stock is reduced and impact of the roller on the stock is cushioned, and the mounting for each of said rollers permitting relative transverse shift of the rollers to accommodate such temporary changes in cross-sectional shape of the stock as might occur without changing its circumferential dimension.

19. In a device for gauging fed stock, a frame, a V-grooved roller fixed for rotation in said frame, a member pivoted in said frame, a V-grooved roller carried by said member with provision for axial play, manually operative means for pivotally moving said member to move its roller toward and away from the other roller, said means comprising a power transmission including a frictional retarding means and a lost motion connection, an indicator having a plunger, an arm pivoted on the said roll-carrying member, spring pressed against a stop thereon, with its free end abutting said indicator plunger, and spring means opposing the tendency of said pivoted member with its roller to bear on the stock when, due to the lost motion connection, the said pivoted member is freely movable on its pivot.

20. In a device adapted for the continuous gauging of substantially cylindrical fed stock, a frame, a pair of cooperative gauging anvils on said frame so mounted as to be capable of relative bodily movement to increase and decrease the distance between them and to be capable of relative transverse shift, an indicator, and means for transmitting relative bodily movement of said anvils in either direction proportionally to said indicator, said anvils each being grooved to provide tangential stock-engaging faces at an angle to each other of substantially ninety degrees.

21. In a device for the continuous gauging of substantially cylindrical fed stock, a frame, a pair of cooperative gauging rollers on said frame so mounted as to be capable of free rotation and relative bodily movement to increase and decrease the distance between them, an indicator, and means for transmitting relative bodily movement of said rollers proportionally to said indicator, one of said rollers being circumferentially grooved providing stock-engaging faces at an angle to each other of substantially ninety degrees whereby said roller is adapted to embrace the stock and be rolled by contact therewith at spaced lines.

22. In a gauge the combination of a frame, a pair of gauging anvils thereon adapted for relative bodily movement, and means for indicating said movement, said anvils being adapted to the gauging of substantially cylindrical stock as it is fed lengthwise between them and at least one of said anvils having a groove therein providing stock engaging faces substantially tangential to the stock.

23. A device for indicating variations in thickness in substantially cylindrical stock as it is fed lengthwise, comprising a frame, opposed gauging anvils adapted for relative bodily movement and between which the stock may be fed non-rotatively in a lengthwise direction, an indicator, and means for moving the indicator proportionally to the movement of the anvils, at least one of said anvils having a substantially V-shaped groove adapted to receive the stock, guide it in its feed and provide spaced lines of contact with the stock as it is fed.

24. A gauge comprising a frame, a lower gauging anvil on said frame, a bracket adjustable on said frame, means for fixing the bracket in adjusted position, an indicator supported by said bracket having an operating plunger, a member pivoted in said frame carrying an upper gauging anvil, and a member yieldingly held on said pivoted member adapted to govern the operating plunger of the indicator.

25. A gauge comprising a frame, a lower gauging anvil on said frame, a bracket mounted on said frame, an indicator supported by said bracket having an operating plunger, a member pivoted in said frame carrying an upper gauging anvil, a member yieldingly held on said pivoted member adapted to govern the operating plunger of the indicator, and means for manually moving said pivoted member to spread and reset the anvils, comprising a shaft in the pivoted member, means imposing a drag on rotative movement of said shaft, a crank on said shaft, and a lost motion connection on the crank of said shaft.

26. A device for gauging stock as it is fed lengthwise comprising a pair of opposed cooperative gauging anvils adapted to be relatively moved toward and from each other under control of the stock in passage therebetween, said anvils having 90° angular grooves within which substantially cylindrical stock is adapted to fit and contact at spaced lines with the faces of the grooves, an indicator, and means for transmitting relative movement of said anvils in either direction proportionally to said indicator.

PHILIP J. DARLINGTON.